United States Patent [19]

Gellman et al.

[11] Patent Number: 4,534,989

[45] Date of Patent: * Aug. 13, 1985

[54] SOFT CANINE BISCUIT CONTAINING DISCRETE MEAT AND/OR MEAT BY-PRODUCT PARTICLES AND METHOD FOR MAKING SAME

[75] Inventors: Gary Gellman, Pomona, N.Y.; George A. Erfurt, Morristown; James E. Roe, Wayne, both of N.J.

[73] Assignee: Nabisco Brands, Inc., Parsippany, N.J.

[*] Notice: The portion of the term of this patent subsequent to Jun. 12, 2001 has been disclaimed.

[21] Appl. No.: 614,367

[22] Filed: May 29, 1984

Related U.S. Application Data

[63] Continuation-in-part of Ser. No. 549,353, Nov. 7, 1983, , and a continuation-in-part of Ser. No. 341,970, Jan. 22, 1982, Pat. No. 4,454,164.

[51] Int. Cl.³ .............................................. A23K 1/00
[52] U.S. Cl. .................................... 426/549; 426/466; 426/512; 426/646; 426/805
[58] Field of Search ............... 426/549, 555, 560, 466, 426/512, 634, 630, 646, 623, 635, 805

[56] References Cited

U.S. PATENT DOCUMENTS

| | | | |
|---|---|---|---|
| D. 254,338 | 3/1980 | Miller et al. | D1/27 |
| 982,711 | 1/1911 | Ellis | 426/104 X |
| 3,024,112 | 3/1962 | Burgess | 99/2 |
| 3,368,528 | 2/1968 | Ganoe | 119/29 |
| 3,467,525 | 9/1969 | Hale et al. | 99/2 |
| 3,830,798 | 8/1974 | Herndon et al. | 260/211.5 R |
| 3,883,672 | 5/1975 | Bone et al. | 426/311 |
| 3,891,774 | 6/1975 | Baker et al. | 426/104 |
| 3,908,025 | 9/1975 | Miller et al. | 426/623 |
| 3,946,123 | 3/1976 | Hanna | 426/643 |
| 3,959,511 | 5/1976 | Balaz et al. | 426/549 |
| 3,962,462 | 6/1976 | Burkwall et al. | 426/1 |
| 4,006,266 | 2/1977 | Bone et al. | 426/623 |
| 4,020,187 | 4/1977 | McCulloch et al. | 426/72 |
| 4,039,689 | 8/1977 | Bone | 426/99 |
| 4,055,681 | 10/1977 | Balaz et al. | 426/656 |
| 4,145,447 | 3/1979 | Fisher et al. | 426/72 |
| 4,158,706 | 6/1979 | Ernst et al. | 426/327 |
| 4,190,679 | 2/1980 | Coffee et al. | 426/623 |
| 4,215,149 | 7/1980 | Majlinger | 426/292 |
| 4,229,485 | 10/1980 | Brown et al. | 426/305 |
| 4,273,788 | 6/1981 | Bone et al. | 426/104 |
| 4,284,652 | 8/1981 | Christensen | 426/72 |
| 4,294,857 | 10/1981 | Fuller | 426/99 |

OTHER PUBLICATIONS

Rossen et al., "Food Extrusion", Food Technology, Aug. 1973, pp. 46–54.

Better Homes and Gardens (Apr. 1963), p. 123.

*Primary Examiner*—R. B. Penland
*Attorney, Agent, or Firm*—Richard Kornutik

[57] ABSTRACT

A dry soft canine biscuit having visually apparent, discrete meat and/or meat by-product particles distributes substantially uniformly throughout the biscuit is obtained by blending the non-fat solids portion of a soft biscuit dough with particles which are substantially inert with respect to the biscuit dough, mixing the dry-blended mixture with water plus optional humectant to form an intermediate stage dough, admixing the latter with the fat portion of the biscuit dough to form a final dough, forming the final dough into pieces, and baking and drying the formed pieces to obtain a microbiologically stable product which can be packaged without a barrier material. Meat and/or meat by-product particle inertness is made possible by using particles having: (1) a moisture content of 35 percent by weight or less, and (2) a water activity which is less than the water activity of said soft biscuit dough. The substantial absence of meat particle color bleed into the biscuit principally due to the use of meat products wherein the color is formed as part of the protein matrix. The discrete, visually apparent dehydrated meat particles enhance the palatability and visual attractiveness of the dry biscuit.

20 Claims, No Drawings

SOFT CANINE BISCUIT CONTAINING DISCRETE MEAT AND/OR MEAT BY-PRODUCT PARTICLES AND METHOD FOR MAKING SAME

This is a continuation-in-part of U.S. application Ser. No. 341,970, filed on Jan. 22, 1982 U.S. Pat. No. 4,454,164, and is a continuation-in-part of U.S. application Ser. No. 549,353, filed on Nov. 7, 1983.

BACKGROUND OF THE INVENTION

1. Field of the Invention

The invention relates to a method for incorporating animal protein into a biscuit dough to obtain a dry, soft canine biscuit. The invention also relates to a dry, soft canine biscuit.

2. Description of the Prior Art

Dry pet foods are commonly cereal-type materials having a low moisture content of less than about 15 percent by weight. As a result of their low moisture content, they resist mold growth and bacterial spoilage. Additionally, they can often be packaged and stored in containers, such as a box, without the need for hermetic sealing and without the need for a moisture barrier. Dry pet foods typically have low palatability because of their low moisture content.

The incorporation of meat products, fish products and poultry products into a farinaceous pet food to improve palatability and to improve nutritional values of dry pet foods, intermediate moisture products and high moisture content pet foods (more than about 50 percent by weight of water) is known in the art.

U.S. Pat. No. 3,946,123 discloses an aqueous suspension or broth of meat and meat by-products consisting in part or entirely of fish and flavored cereal chunks. The meat and meat by-products that may be used include those of fowl and fish, as well as that of mammal, such as cattle, swine, goats and the like. Due to the high moisture content of the product, it must be packaged in cans. In U.S. Pat. No. 4,158,706 a high moisture pet food product containing farinaceous and proteinaceous components such as meats, fish and poultry is impregnated with a preservative such as succinic acid to enable packaging within a paper or polymer film. These high moisture content products have a high shipping weight for a given amount of nutritive value and do not provide a hard surface for the strengthening of gums and for the removal of plaque from teeth.

The production dry pet foods which contain proteinaceous and farinaceous material is disclosed in U.S. Pat. Nos. 3,962,462, 4,020,187, 4,039,689, 4,055,681, 4,145,447, 4,215,149 and 4,229,485.

In U.S. Pat. No. 3,962,462 the ingredients are first dry-blended and then water and water-containing ingredients are added until a cohesive dough is formed. A stabilizing system comprising a sugar, an edible acid and an antimycotic provides stability within the pet food when the pet food is subjected to semi-moist conditions. The product is produced in wafer form for packaging with a semi-moist pet food. The proteinaceous material includes meat, such as the flesh of cattle, swine, sheep, poultry and fish, as well as various meals such as meat and bone meal, fish meal and the like.

In U.S. Pat. No. 4,020,187 tallow or lard is added to a water slurry of a ground mixture of meat and meat by-products to raise the resulting fat content of the mixture to at least 25 percent. The resultant mixture is then homogenized to liquefy and reduce the particle size to uniformly distribute the fat content through the meat mixture. Dry farinaceous ingredients are ground and added to the homogenized meat mixture. The blended mixture is subjected to a temperature of from 225° to 325° F. at a pressure of at least about 50 p.s.i. The product is expanded, cut and dried to obtain a product having a final moisture content of from 7 to 15 percent. The product, it is disclosed, is not externally greasy and may be packaged in ordinary paper bags or in plastic wrap.

A dry, but soft, pet food is produced in U.S. Pat. No. 4,039,689 using low temperatures and pressures. The use of the low processing temperatures, less than about 130° F., leads to the soft dry nature of the pet food, it is disclosed. Meat and meat by-proucts, as well as dried animal by-products, can be used as a protein source for the pet food; in U.S. Pat. No. 4,039,689. The dried animal by-products include meat and bone meal.

U.S. Pat. No. 4,055,681, like U.S. Pat. No. 4,039,689, produces a soft dry pet food having a meat-like texture and appearance. Meat meal is disclosed as a protein source and fresh meat and meat by-products are used to impart palatability to the pet food.

In the production of the dry pet food products according to the processes of the above patents, the use of wet meat products cause substantial smearing or blending of the meat into the farinaceous material. It also causes bleeding of the protein colors into the farinaceous material, which reduces the visual attractiveness of the product to the consumer and which reduces the product's hardness.

A hard dry pet food is produced in U.S. Pat. No. 4,145,447. High pressures of at least about 100 p.s.i. are used to obtain a product which is hard enough to provide chew-resistance for the removal of plaque or tartar from the animal's teeth. The product is a long-lasting one which requires about 30 minutes to 2 hours for a 25 lb. dog to consume. Dry components are mixed until homogeneous and then sufficient water is added to wet the product without affecting the apparent dry, free-flowing characteristic of the product. The wetted product is then compacted, at a pressure of at least 100 p.s.i., followed by heating or baking the compacted product at a temperature of at least 200° F. The product can contain air-dried, freeze-dried or irradiated foods such as meat, fish, fish meal, cereals, fruits, vegetables and the like. Protein fibers, such as those derived from soy protein and wheat gluten, or animal fibers, such as those derived from skin, muscles, and intestines, are optionally added to support the structure of the product. The animal fibers can be prepared by cutting, chipping, grinding, shredding, shearing or beating animal skins, such as cowhide or rawhide. The high pressures used in the process of U.S. Pat. No. 4,145,447 make the process costly. Also, the structure-supporting fibers derived from animal tissue, which are optionally used in the process of U.S. Pat. No. 4,145,447, are low in palatability. Furthermore, a product having discrete, visually-apparent, meat particles is not disclosed.

U.S. Pat. Nos. 4,125,149 and 4,229,485 disclose processes for improving the palatability of dry pet foods by applying a coating, which contains proteins derived from animals, to the surface of the pet food. In U.S. Pat. No. 4,215,149 the surface of the pet food is treated with fat and then with a phospheric acid salt. Treatment of the surface of the pet food with meat flavors and animal proteins is optional. Heating of the coated pet food, it is disclosed, must be avoided.

In U.S. Pat. No. 4,229,485 a dry biscuit is coated with a continuous glazed liver coating and is then baked to less than 18 percent moisture by weight. The liver preferably constitutes at least about 50 percent by weight of the coating, exclusive of moisture. The liver coating contains farinaceous material and comminuted liver. The hard glazed coating, it is disclosed, has the visual appearance of a meat coating to enhance the product's attractiveness to pets. The dry biscuits, to which the liver coating is applied, are obtained by baking a combination of uncooked farinaceous material and uncooked meat or meat by-products. The use of the uncooked meat or meat-products in the form of finely cut flakes, preferably having their largest dimension in the range of 15/1000 inch to 250/1000 inch, it is disclosed, is necessary for obtaining high palability of the product. However, the use of uncooked meat or meat by-products results in the blending of the protein color into the farinaceous material. Additionally, the flakes present in the biscuit are not visually apparent because of the liver coating.

U.S. Pat. No. 4,310,558 teaches producing a dry pet food product containing fibrous food pieces having a tough, pliable texture combined with a basal matrix containing proteinaceous and farinaceous material hving a porous texture and appearance. The fibrous food pieces, which may simulate vegetables, grains and red meat pieces, comprise denatured proteinaceous material. The food pieces are blended with undenatured proteinaceous materials and farinaceous materials. The mixture is mechanically worked under conditions of elevated temperature and pressure and finally extruded to form an expanded dry pet food product having a porous texture interspersed with food pieces having a tough, pliable fibrous texture. The mechanical working and forming is basically done in a cooker extruder, which utilizes high shear and substantial pressure.

BROAD DESCRIPTION OF THE INVENTION

An object of the invention is to provide dry soft canine biscuits having discrete meat and/or meat by-products particles distributed substantially uniformly throughout the biscuits. Anothe objective of the invention is to provide a method for making such dry soft canine biscuits. A further object of the invention is to provide dry soft canine biscuits and method of producing such biscuits which overcomes the disadvantages of the above prior art. Other objects and advantages of the prior art are set out herein or obvious herefrom to one ordinarily skilled in the art.

The objects and advantages of the invention are achieved by the dry soft canine biscuit and the production method of the invention.

According to the invention, there is provided a dry soft canine biscuit, having discrete meat and/or meat by-product particles distributed substantially uniformly throughout the soft biscuit. The particles are visually apparent as discrete particles, do not separate from the remaining, or farinaceous portion of the soft biscuit during shipping, and enhance the palatability of the soft biscuit by providing a flavor impact. The product is highly stable and can be packaged directly into a paper board box. The method for making the dry soft canine biscuit of the present invention is economical, does not involve the use of high pressure and/or high shear to compact the soft biscuit dough as in U.S. Pat. Nos. 4,145,447, 4,229,485 and 4,310,558, avoids substantial bleeding of the animal protein color into the farinaceous material, maintans particle discreteness and achieves substantially uniform distribution of the particles throughout the soft biscuit. It is not necessary to use a food grade dye in the particles.

The invention includes a method for making a dry soft canine biscuit having enhanced palatability and enhances eye appeal. Discrete meamt and/or meat by-product particles are distributed substantially uniformly throughout the dry soft biscuit and are visually apparent to the consumer as discrete particles. The presence of meat and/or meat by-product particles substantially above or on the soft biscuit surface is kept to a minimum to reduce the opportunity for meat particle loss from physical abuse during transit. The particle distribution is accomplished by first dry-blending the meat and/or by-product particles with the non-fat solids portion of a soft biscuit dough, admixing the dry-blended mixture with water plus optional humectant and then adding the fat portion of the soft biscuit dough to form a soft dough. The invention process forms the soft dough using low pressure and/or low-shear (preferably as little pressure and/or shear as possible) forming means or techniques. Alternatively, the water, the optional humectant and fat can be admixed simultaneously with the dry-blended mixture. Visual awareness and biscuit hardness maintenance of the meat and/or meat by-product particles is achieved by using particles which are inert with respect to the soft biscuit dough. Inertness of the meat and/or meat by-products particles is made possible through the use of particles: (a) having a moisture content of 35 percent by weight or less; and (b) having a water activity which is less than the water activity of the soft biscuit dough during mixing, if the soft biscuit dough ingredients were mixed without the meat and/or by-products particles.

DETAILED DESCRIPTION OF THE INVENTION

The dry, soft canine biscuit of the invention comprises discrete, visually apparent meat and/or meat by-product particles which are uniformly distributed throughout the soft biscuit. The remaining, or non-meat and/or non-meat by-product particle portion of the soft biscuit is substantially free of meat particle color. The soft biscuits are very stable microbiologically, and can be stored without refrigeration and without a packaging barrier material such as plastic film. The soft biscuit can be in various shapes such as square, round, triangular, animal-shaped and the like. The preferred shapes are round, T-bone shape and a chop or steak-like shape. The soft biscuits can have a thickness typical of canine biscuits. A preferred thickness is about ½ inch.

The meat and/or meat by-product particles used in the invention can be in the form of specs, flakes, chunks, chips, granules and the like. The particles should be of sufficient size so as to be visually apparent to the consumer as discrete particles when in the soft biscuit of the invention. Prior to incorporation into the soft biscuit, the meat and/or by-product particles should preferably have a diameter of granulation of between about 1/32 of an inch and ½ of an inch. The final soft biscuit will also have particles approximately in this size range. Mixtures of particles within this size range or particles having a given size within this range can be used.

Particle visual awareness and biscuit hardness maintenance are achieved by using meat and/or meat by-product particles which are inert with respect to the soft biscuit. By meat and/or meat by-product particle "inertness" is meant: (a) that the particle does not smear into the soft biscuit dough and retains its integrity through production of the final product; (b) that the meat and/or meat by-product particle color does not substantially bleed into the soft biscuit dough; and (c) that ingredients within the meat and/or meat by-product particles do not adversely affect the hardness and microbiological stability of the final soft biscuit dough.

Meat and/or meat by-product particle inertness is made possible by using meat and/or meat by-product particles having: (1) a moisture content of about 35 percent by weight or less; and (2) a water activity which is less than the water activity of the soft biscuit dough during mixing of the soft dough, if the soft biscuit dough ingredients were mixed without the meat or meat by-product particles. The lower water activity of the meat and/or meat by-product particles substantially prevents the flow of water and protein color from the particles to the soft dough during mixing of the soft dough ingredients and the particles. Higher moisture content and water activity above that of the soft dough would cause smearing of the softer particles into the dough, thereby losing meat and/or meat by-product particle integrity. Also, higher moisture contents could create hardness reduction the formation of steam pockets which turn into air voids upon biscuit leavening. The discreteness of the particles is looked in during drying of the soft biscuit dough.

Fresh meat and/or meat by-products can be dehydrated by known methods to achieve a moisture content of less than about 35 percent by weight. Dehydration also reduces the water activity of the meat and/or meat by-products. Generally, fresh beef has a moisture content of about 65 percent by weight and a water activity of about 1.0. Dehydrating the fresh meat to a moisture content of about 40 percent results in a water activity of about 0.8. Dehydration to about 12 to 20 percent by weight of water results in a water activity for the meat of about 0.7 and lower. Soft biscuit doughs generally have a water activity of about 0.90 and above upon completion of mixing of the non-fat solids portion, the water and the fat portion of the dough. Preferably meat and/or meat by-products having a moisture content of less than or equal to about 20 percent by weight are used because they remain shelf stable without refrigeration prior to incorporation into the soft biscuit.

Microbiological stability of the meat and/or meat by-product particle ingredient is preferably achieved through a low water activity of 0.70 or less. This low water activity is preferably achieved by dehydration. However, the water activity can also be lowered by other processes known in the art. For example, to reduce the water activity, food additives conventionally used for this purpose such as glycerin, propylene glycol, salt, corn syrup, sugar and the like can be included in the meat and/or meat by-product particles in conventional amounts.

Commercially available meats and/or meat by-products having the above low water activity can be used for the meat and/or meat by-product particle ingredient of the invention. Microbiological stability of the meat and/or meat by-products can also be achieved even at water activities above 0.70 by the use of antimycotics and/or antibiotics conventionally used in the art for this purpose. Exemplary of the antimycotics which can be used are potassium sorbate, sorbic acid, sodium benzoate and the like. Suitable commercially available meat products and/or meat by-products which can be used are those which are stored without refrigeration and are packaged in a film of no more than 5 g per sq. cm per 24 hours water vapor transfer rate. The meat and/or meat by-product particles should also be in compliance with NCR nutritional requirements such as 40 percent minimum protein content.

The substantial absence of meat and/or meat by-product particle color bleed into the soft biscuit is principally due to the use of meat products wherein the color is formed as part of the protein matrix. In these meat products the protein is present in its least soluble form, namely denatured and coagulated, and therefore the color is also insoluble. Accordingly, bleeding of the meat protein color into the remaining portion of the soft biscuit cannot take place.

Visual awareness of the meat particles is also effected by using meat products having a dark brown denatured meat protein color. Products having a denatured meat protein color, as measured by an Agtron reflectance value of 10 or less, contrasts excellently with typically soft biscuit doughs to effect visual awareness.

The term "meat" is understood to apply not only to the flesh of cattle, swine, sheep, goats, horses and whales, but also to other sources of animal protein, such as poultry and fish. The term "meat by-product" refers to those non-rendered parts of the carcasses of slaughtered animals, including but not restricted to mammals, poultry and fish, and includes constituents such as liver, kidney, heart, spleen, tongue, trimmings, lungs and skins, embraced the term "meat by-products" in the *Official Publication,* "Official and Tentative Definitions of Feed Ingredients," published by the Association of American Feed Control Officials, Inc., (1979), p. 94. The flesh of some animals, such as fish and poultry, may be too light in color to provide sufficient contrast with the soft biscuit dough so as to enhance visual awareness of the meat particles. In this case, known food colorings can be added to the meat to enhance visual awareness. The meat particles and the meat by-product particles can be used alone or in combination. Each particle can contain both meat and meat by-products from one or more animals.

The preferred meat and/or by-product particles are particles of dehydrated cured meat, most preferably from ground beef. Spiced, dehydrated cured meat particles are highly palatable, have an appetizing odor and are particularly preferred for use in the soft canine biscuits of invention. The preparation of dehydrated cured meat, spiced or unspiced, is well known in the art and does not form a part of the invention. Suitable dehydrated cured meat is commercially available and is commonly referred to as jerky, jerked beef or jerked meat.

Commercially available, dehydrated cured meat products, which contain more than 35 percent moisture, can be dried in a conventional manner to within the above moisture content range.

Known soft biscuit dough formulations for the preparation of dry soft canine biscuits can be used in the pproduction of the soft biscuits of the invention. As indicated above, these soft doughs generally have a water activity of about 0.90 and above upon completion of mixing of the soft dough ingredients. A suitable dough contains at least one farinaceous material, the predominant one being glutenous, salt, animal fat, flavorings, added vitamins and minerals and an antioxidant, such as those disclosed in U.S. Pat. No. 4,229,485 at column 5, lines 7 to 25 and 37 to 57, a humectant such as sugar, propylene glycol, glycerin, sorbitol and corn syrup, and chemical leavening. The compositions of the invention also preferably contain at least one animal-derived proteinaceous meal such as meat meal, bone meal and fish meal. A preferred soft biscuit dough for producing the soft biscuits of the invention contains about 40 to about 50 percent by weight of wheat flour, and about 10 to about 15 percent by weight of sugar (e.g., sucrose), about 5 to 15 percent by weight of humectant, about 3 to about 10 percent by weight of meat meal, about 1 to about 5 percent by weight of chemical leavening, about 1 to about 10 percent by weight of animal fat preserving with BHA, about 15 to about 25 percent by weight of water, and about 2 to about 5 percent by weight of natural flavors, and vitamin and mineral preblend. More generally, useful soft biscuit doughs can contain about 15 to about 35 percent by weight of water, about 0.5 to about 10 percent by weight of fat and about 5 to about 20 percent by weight of sugar. Use of the humectant is optional, but is preferred to enhance the softness of the product and to effect less breaking force. Suitable humectants are known in the art and include glycerin, sorbitor, propylene gylcol, corn syrup and sugar. Chemical leavening, known in the art, can be used. Illustrative thereof is calcium acid phosphate with sodium bicarbonate and/or ammonium bicarbonate.

The relative amount of the meat and/or meat by-product particles and the soft biscuit dough should be such as as to result in a dry soft biscuit product wherein the weight percent of the particles is about 3 to about 15 percent by weight, preferably about 5 to 10 percent by weight, of the final dry, soft biscuit product. Compliance to NRC nutritional requirements is enhanced by even these low levels of the 40 percent minimum protein meat and/or meat by-product particles. Lower or higher levels of the meat particles can be used provided biscuit integrity is maintained, the meat particles do not extend appreciably above the surface of the soft biscuit so to separate from the soft biscuit during shipment, the final product remains visually attractive to the consumer, and the product is economical to produce.

In producing the dry, soft canine biscuit of the invention the meat and/or meat by-product particles are blended with the solid non-fat portion of the soft biscuit dough. By incorporating the meat particles into the solid non-fat portion of the soft biscuit dough, the meat particles are distributed substantially uniformly throughout the final soft biscuit product. The portion of the particles at the surface of the soft biscuit are visually apparent as discrete particles. Particles substantially below the surface, however, are also of sufficient size and integrity to be visually apparent as discrete particles upon breaking the soft biscuit in two, for example.

All mixing can be done at 20 to 100 rpm. The dry-blending step is typically conducted at room temperature for a period of time of about 3 minutes to about 10 minutes so as to obtain a uniform mixture of the meat and/or meat by-product particles and non-fat portion of the soft biscuit dough. The dry-blended mixture is then mixed with the hot water plus the optional humectant to form a first stage soft dough. This methodology minimizes the occurrance of meat and/or meat by-product particles substantially above and on the final soft biscuit surface. As a result, the opportunity for meat and/or meat by-product particle loss from physical abuse during transit is reduced. The water is admixed with the dry-blended mixture and is typically at a temperature of about 65° to about 150° F. The hot water is added, with mixing, over a period of time of about 3 minutes to about 5 minutes form the first stage soft dough. Then the fat portion of the soft biscuit dough is admixed with the first stage soft dough to form the final stage soft dough. The fat portion is added at a temperature at which it is at least fluid, typically at about 100° to about 150° F. The fat portion is mixed for a period of time which is sufficient to form a soft dough whose homogeneity is visually apparent. A typical final mixing time is about 3 minutes to about 8 minutes.

Formation of the soft dough is achieved at about atmospheric pressure with mixing of the components being conveniently achieved in an upright sigma blade mixer or other bakery-type mixers. The various ingredients can be added over a period of time or in a one-shot manner according to the above order of addition. However, melted fat and water can be added simultaneously and mixed 6 to 12 minutes.

The soft dough is then formed into pieces by horizontal or vertical extrusion followed by cutting. The cutting is preferably substantially perpendicular to the direction of flow of the extruded soft dough. Thus, when horizontal extrusion is utilized, the extruded soft dough is preferably cut substantially perpendicular to the top surface of the oven band. When vertical extrusion is used, the extruded soft dough is cut preferably substantially parallel to the top surface of the oven band. Suitable die and cutter shapes are those which result in a round, square, rectangular, triangular, tubular, or cylindrically shaped soft biscuit product and the like. The forming is accomplished at conventional temperatures of ambient to 110° F. and pressures of less than 75 p.s.i. (gauge), used with a horizontal or vertical extruder. An essential or critical feature of the invention is that the forming of the soft dough pieces is done using low shear and/or low pressure forming or techniques. High shear or high pressure forming will decimate or smear the meat and/or meat by-product particles and/or will cause bleeding or running of any dye used in the particles. The forming pressure is less than 75 p.s.i.g.

Non-cooking forming conditions herein means that the forming is achieved at a temperature whereby none of the protein in the hard dough material is denatured and none of the starch in the hard dough material is gelatinized. Low-shear forming conditions herein means that forming is achieved at 25 sec.$^{-1}$ or less. (High shear herein means greater than 25 sec.$^{-1}$, which excludes the use of high-shear cooker extruders in the invention.) See Rossen & Miller, "Food Extrusion", Food Technology, Aug. 1973, pages 46 to 53, especially page 52.

The formed pieces are then baked, followed by drying, to achieve a shelf stable product without the need of a moisture barrier protection. Baking and drying temperatures and times are those conventionally used in the production of a dry, soft canine biscuit. The pieces are dried to obtain a soft biscuit having a water activity of 0.70 or less. Tyfpical baking temperatures and times are about 300° F. to about 475° F. for about 25 minutes to about 8 minutes. Drying conditions are typically about 200° to about 325° F. for about 25 minutes to about 12 minutes in a forced air dryer. On a weight basis, the moisture content of the final biscuit product is less than or equal to about 15 percent by weight and preferably about 10 to about 12 percent by weight of the final soft biscuit at 70 percent relative humidity.

The hardness of the final soft biscuit of the invention as measured in a cracking test on a Dillon dynameter should be about 5 to about 15 lbs. for a ½ inch thick sample using a pin-point tester having a 3/32 inch diameter tip. The tip has a concave bottom with a maximum depth of 1/16 inch. In this test, the hardness reading in pounds is linearly proportional to the sample thickness. Thus, a ¼ inch thick sample should have hardness of about 3 to 8 lbs. A hard biscuit, as opposed to the soft biscuit of the invention, would have a Dillon dynamometer hardness value of about 30 to about 50 lbs for a ½ inch thick sample.

The invention is further illustrated in the following examples wherein all percentages, parts, ratios and proportions are by weight and all temperatures are in °F., unless otherwise stated herein or otherwise obvious herefrom to one ordinarily skilled in the art.

EXAMPLE 1

In this example, spiced dehydrated cured beef granules having a moisture content of about 15 percent by weight, a granulation between 1/32 of an inch and ⅛ inch, and having a dark brown denatured meat protein color of Agtron reflectance value of 10 or less were used. Spiced dehydrated cured meat granules were obtained by granulating dehydrated cured meat having the composition:

| Dehydrated Cured Meat | Pounds |
|---|---|
| Meat By-Products | 650 |
| Meat | 268 |
| Natural Flavors | 1 |
| Spices | 29 |
| Cure (Sodium Nitrite) | 1 |
| Potassium Sorbate | 0.5 |
|  | 949.5 |

Then, 50 lbs of the spiced dehydrated cured meat granules were combined with the non-fat solids portion of a soft biscuit dough, the fat portion of the soft biscuit dough and water plus humectant to from a soft dough in accordance with the process of the invention. The ingredients, amounts, and the process for making the soft biscuits were:

| Biscuit and Meat Chips | Pounds |
|---|---|
| Wheat Flour (soft flour of about 9% by weight protein) | 400 |
| Sugar | 117 |
| Glycerin (humectant) | 100 |
| Dehydrated Cured Meat | 50 |
| Skim Milk Powder | 16 |
| Meat Meal | 36 |
| Chemical Leavening | 17 |
| Salt | 4 |
| Animal Fat Preserved with BHA | 75 |
| Natural Flavors | 33 |
| Vitamin and Mineral Preblend | 18 |
| Color | 1 |
| Water | 200 |
|  | 1067 pounds |

The dehydrated cured meat was dry-blended with the solid non-fat portion of the soft biscuit dough in an upright sigma blade mixer at 20 rpm for 10 minutes. Then the 200 pounds of water, at a temperature of 150° F., plus the 100 lbs of glycerin at an ambient temperature were added together with 140° F. fat to the pre-blend and mixed for 6 minutes to form the soft dough. The soft dough was then machined on a horizontal extruder through dies measuring 3/8 inch in diameter followed by vertical cutting into 1¼ inch length cylinders. The formed pieces were then baked in a band oven for 8 minutes followed by drying at 250° F. for 20 minutes in a band dryer to achieve a dry, soft shelf stable product having a Dillon dynamometer hardness reading of about 4 to 11 for the ⅜ inch thick sample. The baking temperatures in the band oven were:

| Band Oven Baking Temperatures | Zone |
|---|---|
| 530° F. | 1 |
| 530° | 2 |
| 550° | 3 |
| 300° | 4 |
| 300° | 5 |
| 300° | 6 |
| Off | 7 |
| Off | 8 |
| Off | 9 |

The dry, soft, dog biscuit product was dump-packed into a carton without the need for moisture barrier protection. The hardness tests on the product were performed using a Dillon dynamometer as described above.

EXAMPLE 2

A Greusot Loire BC72 cooker extruder, having a 1000 mm barrel, two barrel heaters and cooling means, was used. A base formulae or mixture was mixed in a dry ribbon blender and then passed to the cooker extruder. The base formula, on a per batch basis, was:

| Ingredients | Amount |
|---|---|
| Salt | 13 oz. |
| Natural flavors | 1 lb. |
| Wheat flour | 60 lbs. |
| Fine granular sugar | 9 lbs. 8 oz. |
| Wheat germ meal | 1 lb. |
| Skim milk powder | 1 lb. |
| Tallow | 1 lb. |
| Total | 74 lbs. 5 oz. |

All of the ingredients except the tallow was screened through a U.S. No. 10 Mesh screen. Beef jerky was used which went through a U.S. No. 4 Mesh screen and stayed on a U.S. 8 Mesh screen. All of the dry blend (base formula) was dry blended in the ribbon blender for 10 minutes. Depending on the particular experiment, various amounts of beef jerky particles were added to the mixture and the mixture was dry blended in a Hobart mixer. The tallow was then added to the subsequent mixture, followed by further dry blending to achieve a uniform mass.

The specifics of the beef jerky granules were as follows:

| Experiment No. | Amt. of Jerky | Water Content of Jerky | Amount of Oil Sprayed in Jerky |
|---|---|---|---|
| S-1E | None | — | — |
| S-2E | 4 lbs. 12 ozs./ 74 lbs. 5 ozs. of base formula | 25% | 1% |
| S-3E | 4 lbs. 12 ozs./ 74 lbs. 5 ozs. of base formula | 25% | 1% |
| S-4E | 9 lbs. 8 ozs./ 74 lbs. 5 ozs. | 35% | 1% |

-continued

| Experiment No. | Amt. of Jerky | Water Content of Jerky | Amount of Oil Sprayed in Jerky |
|---|---|---|---|
| S-2E + B | of base formula 17 gm/273 gm. of base formula | 25% | None |

Notes:
(a) S means base formula according to the above-cited ingredient portions.
(b) B means baking in a reel oven.
(c) E means extrusion
(d) The oil sprayed on the jerky granules to simulate the preferred teaching in Nahm, but the oil did not prevent jerky granules from being decimated by the high-shear extrusion or from being torn apart upon exiting from the extruder dye as the dough product expanded.

The control (S-1E) and the three experiments representing U.S. Pat. No. 4,310,558, Nahm (S-2E, S-3E and S-4E) were subjected to high shear cooker extrusion after dry blending. The data on the extrusion:

| Material Extruded | Extruder Pressure Die | Extruder Screw Speed | Extrudate Temp. | Percent Added H$_2$O in Extruder |
|---|---|---|---|---|
| S-1E | 170 to 180 psig | 180 rpm | 168° F. | 10 |
| S-2E | 170 to 190 psig | 275 rpm | 150° F. | 13 |
| S-3E | 7 to 43 psig | 295 rpm | 160° F. | 20–22 |
| S-4E | 168 to 190 psig | 260 rpm | 166° F. | 11 |
| S-4E-1 | 54 to 74 psig | 260 rpm | — | 16 |

Note:
Most of the extrudate temperatures were over 160° F., which is at least sufficient to denature the protein. The material in the extruder was at a higher temperature because there was a flash off of the water as it exited from the extruder.

Further data on the extrusion was:

| Material Extruded | Extruder Barrel Heaters (2) | Extruder H$_2$O Coolant | Extruder Die Opener | Rate of Extrudate |
|---|---|---|---|---|
| S-1E | 161°, 138° F. | 112° F. | ⅜" × 3/16" | 6.5 lb/min |
| S-2E | 161°, 140° F. | 115° F. | ⅜" × 3/16" | — |
| S-3E | 161°, 141° F. | 120° F. | ⅜" × 3/16" | — |
| S-4E | 150°, 120° F. | 114° F. | ⅜" × 3/16" | 6.5 lb/min |
| S-4E-1 | 150°, 110° F. | 100° F. | ⅜" × 3/16" | — |

More data on the extrusion and drying was:

| Material Extruded | Cutter Blade Setting | Extruder Drive Load | Drying the Extrudate Temp. | Drying the Extrudate Time |
|---|---|---|---|---|
| S-1E | 9 | 53 amps. | 200° F. | 1.5 hrs. |
| S-2E | 9 | 49 amps. | 200° F. | 1.5 hrs. |
| S-3E | 10 | 42 amps. | 200° F. | 1.5 hrs. |
| S-4E | 10 | 42 amps. | 200° F. | 1.5 hrs. |
| S-4E-1 | 10 | 36 amps. | 200° F. | 1.5 hrs. |

Note:
The extrudates were dried in a Proctor Schwartz

The invention was represented by experiment S-2E+B. The water content and the dough was 32 percent. Extrusion was done in a low shear extruder (i.e., a meat grinder, "Kitchen Aid Grinder", with blades) using a die opening of 0.5 inch diameter. The manual cut off was 1 to 1.5 inch. The temperature of the extrudate was 90° F. and the actual pressure at the exit point at the back of the die was 15 to 20 p.s.i.g. The temperature of the dough processed in the low shear extruder never exceeded 105° F. and accordingly was not cooked in the low shear extruder. The extruded material was then baked in a reel oven at 350° F. for 36 minutes.

The pet food poeces prepared by the several experiments had the following characteristics:

| Experiment Number | Sensory Observations | Agtron Color (lower reading means a darker color) |
|---|---|---|
| S-1E | Off white, relatively smoothe surface. Some pock marks noted on surface regions. | 66 |
| S-2E | Very light tan; relatively smooth surface. Some pock marks noted on surface regions. A few random, reduced size (−10 mesh) particles visible throughout. | 57.5 |
| S-3E | Very light tan; relatively smooth surface. Some pock marks noted on surface regions. A few, random, reduced size (−10 mesh) particles visible throughout. | 54.5 |
| S-4E | Tan; relatively smooth surface. Some pock marks noted on surface regions. A few randon, reduced size (−10 mesh) particles visible throughout. | — |
| S-4E-1 | Brown and tan. No definition. Gnarled, porous mass. | — |
| S-2E + B | Light, golden, brownish tan; discrete, non-smeared, large jerky particles on the surface; there was good jerky granule integrity. Smooth surface with some very small indentations. No visible porosity. | — |

What is claimed is:

1. A method for making dry soft canine biscuits having discrete meat and/or meat by-product particles distributed substantially uniformly throughout comprising:
   (a) dry blending particles containing meat and/or meat by products as substantial components with non-fat solids containing farinaceous material and added sugar, said particles having a moisture content of less than or equal to about 35 percent by weight and being present in an amount sufficient to provide particles visible on the surface of said by soft canine biscuits;
   (b) admixing about 20 to 30% by weight water with said dry blended mixture to form a first stage soft dough;
   (c) mixing about 0.5–10% by weight fat with said first stage soft dough to form a final soft biscuit dough;
   (d) forming said final soft dough into pieces under low shear, non-cooking forming conditions; and
   (e) baking and drying said pieces to form dry soft biscuits,
   wherein the water activity of said particles in step (a) is less than the water activity of said final soft dough obtained by admixing said non-fat solids, said fat and said water without said particles, and whereby dry, biscuits are produced having discrete visually-apparent meat particles distributed substantially uniformly throughout and embedded in the surface of said dry soft canine biscuits.

2. A method for incorporating meat and/or meat by-product particles into a soft biscuit dough to form dry soft canine biscuits comprising;
   (a) dry blending particles containing meat and/or meat by-product as substantial components and having a moisture content of less than or equal to about 35 percent by weight with non fat solids, said particles having a water activity which is less than the water activity of said soft biscuit dough, said particles being present in an amount sufficient to provide particles visible on the surface of said dry soft canine biscuits, said non-fat solids containing farinaceous material and added sugar;
  (b) admixing about 20 to 30% by weight water with said dry blended mixture to form a first stage soft dough;
  (c) mixing about 0.5 to 10% by weight fat with said first stage soft dough to form a final soft biscuit dough;
  (d) forming said final soft dough into pieces under low shear, non-cooking forming conditions, there not being any substantial smearing of said particles in said first stage soft dough or said final stage soft dough; and
  (e) baking and drying said pieces to form dry soft biscuits,
whereby the water activity of said dry soft biscuits is 0.70 or less and whereby said dry, soft biscuits are produced having discrete visually-apparent meat particles distributed substantially uniformly throughout and embedded in the surface of said dry soft canine biscuits.

3. In a method for making dry soft canine biscuits from a final soft biscuit dough, the improvement comprising:
  (a) admixing particles containing meat and/or meat by-product as substantial components and having a moisture content of less than or equal to about 35 percent by weight of the particles and a water activity of 0.70 or less with non-fat solids to form a substantially homogeneous dry blended mixture, said particles being present in an amount sufficient to provide particles visible on the surface of said dry soft canine biscuits, said non-fat solids containing farinaceous material and added sugar;
  (b) admixing about 20 to 30% by weight water with said dry blended mixture to form a first stage soft dough;
  (c) mixing about 0.5–10% by weight fat with said first stage soft dough to form said final soft biscuit dough;
  (d) forming said final soft biscuit dough into pieces under low-shear non-cooking forming conditions at a pressure less than 75 psig which maintains the discreteness of said particles; and
  (e) baking and drying said pieces to form said dry soft biscuits, which are shelf stable, whereby said dry, soft biscuits are produced having discrete visually-apparent meat particles distributed substantially uniformly throughout and embedded in the surface of said dry soft canine biscuits.

4. The method as claimed in claim 3 wherein said meat and/or meat by-product particles are present in step (a) in an amount of about 3 to about 15 weight percent, based on the total weight of said dry soft canine biscuit.

5. The method as claimed in claim 3 wherein said water and said fat portion in steps (b) and (c) are added simultaneously to the dry mixture of step (a).

6. The method as claimed in claim 3 wherein the particles of step (a) are shelf stable meat particles.

7. The method as claimed in claim 3 wherein the particles of step (a) have a moisture content of less than or equal to about 20 percent by weight of the particles.

8. The method as claimed in claim 3 wherein said pieces of step (d) are dried to a moisture content of 10 to 12 percent weight of the biscuit.

9. The method as claimed in claim 3 wherein said soft biscuits have a hardness equivalent to a reading of 5 to 15 lbs. for a biscuit having a thickness of about ½ inch measured on a Dillon dynamometer having a pinpoint tester with a 3/32 inch diameter tip having a concave bottom.

10. The method as claimed in claim 3 wherein said particles have a granulation of between about 1/32 inch and about ½ inch.

11. The method as claimed in claim 3 wherein said particles comprise spiced dehydrated meat particles.

12. The method as claimed in claim 11 wherein said particles have a dark brown denatured meat protein color of Agtron reflectance value of 10 or less.

13. The method as claimed in claim 3 wherein said particles are spiced, dehydrated, cured meat granules.

14. The method as claimed in claim 3 wherein the water which is admixed with the dry blended mixture is at a temperature of about 65° to about 150° F.

15. The method as claimed in claim 14 wherein the fat portion of the soft biscuit dough is added at a temperature of about 100° to about 150° F.

16. The method as claimed in claim 14 wherein said dry blending is for a period of time of about 3 minutes to about 10 minutes, the dry blended mixture is mixed with water for a period of time of about 3 minutes to about 5 minutes, and wherein said mixing of the fat portion is for a period of time of about 3 minutes to about 5 minutes.

17. The method as claimed in claim 14 wherein said forming of said final soft dough into pieces is on a horizontal extruder followed by cutting.

18. The method as claimed in claim 14 wherein said pieces are formed by vertical extruding followed by cutting.

19. The method as claimed in claim 18 wherein said pieces are cut substantially perpendicular to the direction of the flow of the extruded dough.

20. The method as claimed in claim 14 wherein said pieces are dried to obtain a soft biscuit having a water activity of 0.70 or less.

* * * * *